(12) United States Patent
Yu et al.

(10) Patent No.: US 7,428,054 B2
(45) Date of Patent: *Sep. 23, 2008

(54) MICRO-OPTICAL SENSOR SYSTEM FOR PRESSURE, ACCELERATION, AND PRESSURE GRADIENT MEASUREMENTS

(75) Inventors: Miao Yu, Boyds, MD (US); Balakumar Balachandran, Rockville, MD (US)

(73) Assignee: University of Maryland, College Park, MD (US)

( * ) Notice: Subject to any disclaimer, the term of this patent is extended or adjusted under 35 U.S.C. 154(b) by 228 days.

This patent is subject to a terminal disclaimer.

(21) Appl. No.: 11/038,156

(22) Filed: Jan. 21, 2005

(65) Prior Publication Data

US 2005/0157305 A1 Jul. 21, 2005

Related U.S. Application Data

(63) Continuation-in-part of application No. 10/270,277, filed on Oct. 15, 2002, now Pat. No. 6,901,176.

(60) Provisional application No. 60/569,296, filed on May 7, 2004.

(51) Int. Cl.
*G01B 9/02* (2006.01)
*G02B 6/00* (2006.01)

(52) U.S. Cl. .................. 356/480; 356/519; 385/12

(58) Field of Classification Search .......... 356/477, 356/478, 480, 502, 505, 506, 519; 385/12, 385/13
See application file for complete search history.

(56) References Cited

U.S. PATENT DOCUMENTS

| 4,329,058 | A | * | 5/1982 | James et al. | 356/480 |
| 4,437,761 | A | * | 3/1984 | Kroger et al. | 356/44 |
| 4,682,500 | A | * | 7/1987 | Uda | 356/519 |
| 4,755,668 | A | * | 7/1988 | Davis | 356/480 |
| 4,778,987 | A | * | 10/1988 | Saaski et al. | 250/226 |
| 4,873,989 | A | * | 10/1989 | Einzig | 600/505 |
| 4,926,696 | A | | 5/1990 | Haritonidis et al. | |
| 5,178,153 | A | * | 1/1993 | Einzig | 600/505 |

(Continued)

OTHER PUBLICATIONS

A. Sampath, et al., "Active Control of Multiple Tones Transmitted in an Enclosure", Journal of the Acoustical Society of America, vol. 106, No. 1, pp. 211-225, Jul. 1999.

(Continued)

*Primary Examiner*—Patrick Connolly
*Assistant Examiner*—Scott M Richey
(74) *Attorney, Agent, or Firm*—Rosenberg, Klein & Lee

(57) ABSTRACT

A micro-optical fiber tip based sensor system for pressure, acceleration, and pressure gradient measurements in a wide bandwidth, the design of which allows for multiplexity of the input side of the system is based on micro-electromechanical fabrication techniques. The optical portion of the system is based on low coherence fiber-optic interferometry techniques which has a sensor Fabry-Perot interferometer and a read-out interferometer combination that allows a high dynamic range and low sensitivity to the wavelength fluctuation of the light source. A phase modulation and demodulation scheme takes advantage of the Integrated Optical Circuit phase modulator and multi-step phase-stepping algorithm for providing high frequency and real time phase signal demodulation. The system includes fiber tip based Fabry-Perot sensors each of which has a diaphragm that is used as a transducer.

16 Claims, 6 Drawing Sheets

U.S. PATENT DOCUMENTS

| | | | |
|---|---|---|---|
| 5,208,650 A * | 5/1993 | Giallorenzi | 356/477 |
| 5,218,420 A * | 6/1993 | Asmar | 356/480 |
| 5,247,490 A * | 9/1993 | Goepel et al. | 367/149 |
| 5,381,229 A * | 1/1995 | Murphy et al. | 356/477 |
| 5,392,117 A | 2/1995 | Belleville et al. | |
| 5,408,319 A * | 4/1995 | Halbout et al. | 356/480 |
| 5,459,571 A | 10/1995 | Dammann et al. | |
| 5,907,403 A * | 5/1999 | Andrews et al. | 356/480 |
| 6,008,898 A * | 12/1999 | Furstenau et al. | 356/519 |
| 6,016,198 A * | 1/2000 | Burns et al. | 356/477 |
| 6,097,478 A * | 8/2000 | Berthold et al. | 356/35.5 |
| 6,281,976 B1 * | 8/2001 | Taylor et al. | 356/480 |
| 6,317,213 B1 * | 11/2001 | Hall et al. | 356/450 |
| 6,590,665 B2 * | 7/2003 | Painchaud et al. | 356/480 |
| 6,671,055 B1 * | 12/2003 | Wavering et al. | 356/478 |
| 6,738,145 B2 * | 5/2004 | Sherrer et al. | 356/480 |
| 6,894,787 B2 * | 5/2005 | Youngner et al. | 356/480 |
| 6,925,213 B2 * | 8/2005 | Boyd et al. | 385/12 |
| 7,003,184 B2 * | 2/2006 | Ronnekleiv et al. | 385/12 |
| 7,054,011 B2 * | 5/2006 | Zhu et al. | 356/480 |
| 7,072,044 B2 * | 7/2006 | Kringlebotn et al. | 356/477 |
| 7,173,713 B2 * | 2/2007 | Xu et al. | 356/480 |
| 2003/0112443 A1 * | 6/2003 | Hjelme et al. | 356/480 |
| 2003/0169956 A1 | 9/2003 | Lange et al. | |
| 2004/0047536 A1 * | 3/2004 | Pickrell et al. | 385/12 |
| 2006/0244970 A1 * | 11/2006 | Craft et al. | 356/480 |

OTHER PUBLICATIONS

M. Al-Bassyiouni, et al., "Zero Spillover Control of Enclosed Sound Fields", SPIE's Annual International Symposium of Smart Structures and Materials, Newport Beach, CA, Mar. 4-8, vol. 4362, Paper No. 4326-7, 2001.

M. Al-Bassyiouni, et al., "Experimental Studies of Zero Spillover Scheme for Active Structural Acoustic Control Systems", Proceedings of the 12th International Conference on Adaptive Structures and Technologies (ICAST), University of Maryland, College Park, MD, Oct. 15-17, 2001.

Bucarco J.A., et al., "Fiber Optic Hydrophone", Journal of Acoustical Society of America, 62, pp. 1302-1304, 1977.

Cole, J.H., et al., "Fiber Optic Detection of Sound", Journal of Acoustic Society of America, 62, pp. 1136-1138, 1977.

Baldwin, et al., "Bragg Grating Based Fabry-Perot Sensor System for Acoustic Measurements", Proceedings of the SPIE 1999 Symposium on Smart Structures and Materials, Newport Beach, CA, Mar. 1-5, 1999.

J.W. Parkins, "Active Minimization of Energy Density in a Three-Dimensional Enclosure", Ph.D. Dissertation, Pennsylvania State University, 1998.

L.E. Kinsler, et al., "Fundamentals of Acoustics", Second Edition, John Wiley & Sons, Inc., New York, 1962.

B. Balachandran and M. X. Zhao, "Actuator nonlinearities in interior acoustics control," in Proceedings of SPIE Smart Structures and Materials 2000: Mathematics and Control in Smart Structures, pp. 101-109, Mar. 2000.

C. Hess, "Optical microphone for the detection of hidden helicopters", AIAA Journal, vol. 30, No. 11, pp. 2626-2631, Nov. 1992.

G. He, et al., "The analysis of noises in a fiber optic microphone", J. Acoust. Soc. Am., 92 (5), pp. 2521-2526, Nov. 1992.

C. Zhou, et al., "Fiber-optic microphone based on a combination of Fabry-Perot interferometry and intensity modulation", J. Acoust. Soc. Am., 98 (2), Pt. 1, pp. 1042-1045, Aug. 1995.

D. Li, et al., "The ring-type all-fiber Fabry-Perot interferometer hydrophone system", J. Acoust. Soc. Am., 104 (5), pp. 2798-2806, Nov. 1998.

C. Koch, "Measurement of ultrasonic pressure by heterodyne interferometry with a fiber-tip sensor", Applied Optics, vol. 38, No. 13, pp. 2812-2819, May 1, 1999.

P. Beard, et al., "Characterization of a Polymer Film Optical Fiber Hydrophone for Use in the Range 1 to 20 MHz: A Comparison with PVDF Needle and Membrane Hydrophones", IEEE Transactions on Ultrasonics, Ferroelectrics, and Frequency Control, vol. 47, No. 1, pp. 256-264, Jan. 2000.

R. Claus, et a., Editors, "Sensory Phenomena and Measurement Instrumentation for Smart Structures and Materials", Proceedings of SPIE, Mar. 1-4, 1999 Newport Beach, California, vol. 3670, pp. 342-351, 1999.

M. Yu, et al., "Fiber Tip Based Fiber Optic Acoustic Sensors", Twelfth International Conference on Adaptive Structures, Eds. N. Wereley, et al., CRC Press, 245-254, 2001.

* cited by examiner

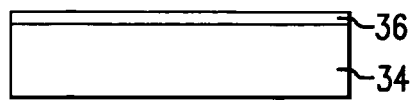
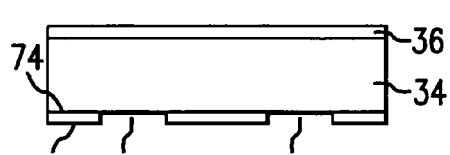
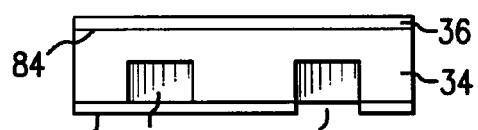
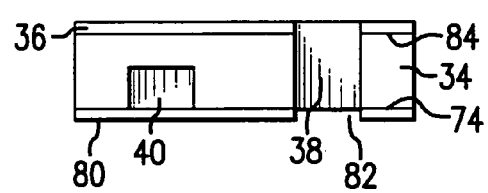
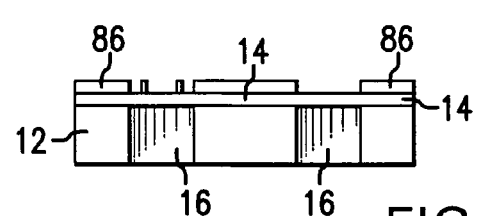
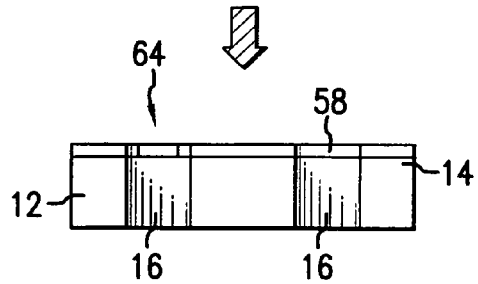
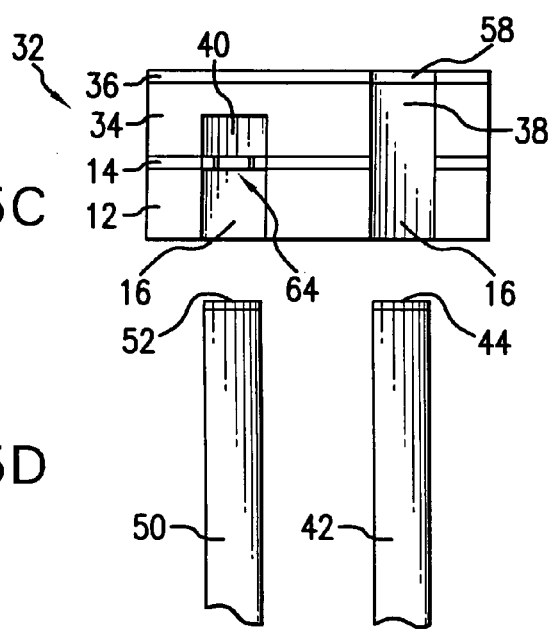
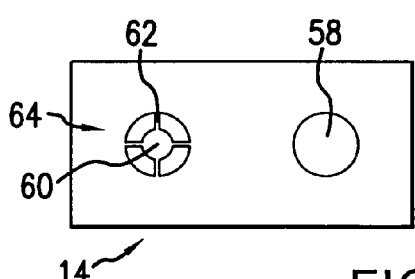

US 7,428,054 B2

MICRO-OPTICAL SENSOR SYSTEM FOR PRESSURE, ACCELERATION, AND PRESSURE GRADIENT MEASUREMENTS

REFERENCE TO RELATED APPLICATIONS

This Utility Patent Application is based on a Provisional Patent Application No. 60/569,296 filed 7 May 2004, and is a Continuation-in-Part of Utility patent application Ser. No. 10/270,277 filed 15 Oct. 2002 now U.S. Pat. No. 6,901,176.

FIELD OF THE INVENTION

The present invention relates to pressure, acceleration, and pressure gradient measurements; and in particular, to micro-optical sensor systems for measurements applicable for surveillance applications, health monitoring of civil structures, diagnostic applications in hostile environments, monitoring in extreme environments such as oil wells, acoustic emission measurements in computer systems, pressure measurements in ignition chambers of automobiles, distributed pressure sensor arrays for adaptive wing structures, and distributed acoustic pressure array panels for acoustic measurements in concert halls, conference rooms, and the like.

Additionally, micro-scale sensors may be used in many micro-scale applications, such as reading optical disk drives, and in networks for dense spatial sampling of phenomena of interest and tracking spatio-temporal events of interest.

Still further, the present invention relates to a micro-optical fiber tip based low-finesse Fabry-Perot sensor system for various acoustic and vibration measurements, such as measurements of acceleration, pressure, pressure gradient, as well as air particle velocity and other parameters of disturbance fields.

In addition, the present invention relates to a micro-scale fiber optic sensor system that is based on principles of MEMS (micro-electro-mechanical system) fabrication techniques combined with low-coherence fiber optic interferometry techniques.

BACKGROUND OF THE INVENTION

In the design of modern transportation vehicles, structural vibration and interior noise have become important problems that must be addressed. For example, control of sound transmission into enclosed spaces is an important issue for helicopter systems. Various studies have shown that the predominant frequency components associated with the noise transmission lie in the frequency range of 50 Hz to 5500 Hz. There are a number of approaches that may be used to control a sound field within a helicopter cabin.

Among the different approaches, one is based on controlling the radiation (transmission) from (through) a flexible structure by active means which is referred to as Active Structural Acoustic Control (ASAC). The ASAC scheme, which is an effective solution for low-frequency applications, takes advantage of vibrating structural elements as secondary noise sources to cancel the sound fields generated by a primary noise source (A. Sampath, et al., "Active Control of Multiple Tones Transmitted in an Enclosure", Journal of the Acoustical Society of America, Vol. 106, No. 1, Pages 211-225, July 1999; M. Al-Bassyiouni, et al., "Zero Spillover Control of Enclosed Sound Fields", SPIE's Annual International Symposium of Smart Structures and Materials, Newport Beach, Calif., March 4-8, Vol. 4362, Paper No. 4326-7, 2001; and, M. Al-Bassyiouni, et al., "Experimental Studies of Zero Spillover Scheme for Active Structural Acoustic Control Systems", Proceedings of the 12th International Conference on Adaptive Structures and Technologies (ICAST), University of Maryland, College Park, Md., Oct. 15-17, 2001). It appears that ASAC schemes require much less dimensionality than Active Noise Control (ANC) schemes in order to realize widely distributed spatial noise reduction. As is known in the art, ANC schemes are generally used to minimize noise by using various cancellation techniques. However, active research is still being pursued to address issues such as sensors, actuators, and control architecture.

Fiber-optic sensors have the advantages of being lightweight, having high sensitivity, and being multiplexible. Since the original demonstrations showed that optical fibers could be used as acoustic sensors (Bucaro J. A., et al., "Fiber Optic Hydrophone", Journal of Acoustical Society of America, 62, Pages 1302-1304, 1977; and, Cole, J. H., et al., "Fiber Optic Detection of Sound", Journal of Acoustic Society of America, 62, Pages 1136-1138, 1977), substantial research has been carried out in this field. Much of this effort has been directed towards the development of hydrophones for ultrasonic detection which does not suit the needs of an ASAC system.

Since Bragg grating sensors were shown to be multiplexible by using Wavelength Division Multiplexing (WDM) techniques, Baldwin, et al., ("Bragg Grating Based Fabry-Perot Sensor System for Acoustic Measurements", Proceedings of the SPIE 1999 Symposium on Smart Structures and Materials, Newport Beach, Calif., Mar. 1-5, 1999), developed a Bragg grating based Fabry-Perot sensor system for use in ASAC schemes. However, the sensor bandwidth was found to be limited, and in addition, the sensor was found to have low sensitivity due to the high Young's modules of silica resulting in "acoustically induced strains" which also limits the application of this type of sensors.

Hence, low finesse Fabry-Perot sensors have become attractive choices for high performance sensing in this area. For example, a Fabry-Perot optical sensing device for measuring a physical parameter, described in U.S. Pat. No. 5,392,117, comprises a Fabry-Perot interferometer through which a multiple frequency light signal having predetermined spectral characteristics is passed. The system further includes an optical focusing device for focusing at least a portion of the light signal going outwards from the Fabry-Perot interferometer and a Fizeau interferometer through which the focused light signal is passed.

The Fabry-Perot interferometer includes two semi-reflecting mirrors substantially parallel to one another and spaced apart so as to define a Fabry-Perot cavity having transmittance or reflectance properties that are effected by a physical parameter such as pressure, temperature, refractive index of a liquid, etc., and which causes the spectral properties of the light signal to vary in response to the changes in physical parameters.

The Fabry-Perot interferometer is provided with at least one optical fiber for transmitting the light signal into the Fabry-Perot cavity and for collecting the portion of the light signal being transmitted outwards. The Fizeau interferometer includes an optical wedge forming a wedge-profile Fizeau cavity from which exits a spatially-spread light signal indicative of the transmittance or reflectance properties of the Fabry-Perot interferometer.

Of particular interest are sensor configurations that may be used for various measurements, such as for instance, measuring displacement, sound pressure, acceleration, as well as pressure gradient, air particle velocity, and acoustic intensity. Currently, there are no commercially available micro-scale fiber optic sensor systems that can be used for these measurements, since the current technology is generally directed toward condenser microphones.

Velocity sensors have numerous advantages, some of which are as follows: (1) better sensitivity to spherical waves compared to the sensitivity of a pressure microphone; (2) can be used along with the pressure microphones to measure the sound energy density; and (3) can be used along with pressure microphones to develop a unidirectional microphone that would favor waves incident from only one direction and discriminate waves incident from other directions.

The concept of a typical velocity microphone is known in the prior art and is based on measuring acoustic pressure by pressure condenser microphones. However, the complexity and bulkiness of known velocity microphones makes them difficult to use effectively in ASAC systems.

A new technology that has been introduced recently by Microflown, a Dutch company, which permits use of small scale air particle velocity sensors. However, these sensors make use of a thermal effect, and they disadvantageously need high operating temperatures. It is thus clear that a velocity sensor free of the disadvantages of prior art velocity sensors is still needed for industrial applications.

As part of ASAC systems as well as Active Vibration Control (AVC) systems, acceleration sensors of high sensitivity and low mass may also contribute to overall control of structural vibration and interior noise. In one manifestation, the conventional accelerometer consists of an inertial mass attached to a spring and this combination is located inside a housing that is exposed to the disturbance. In another manifestation, the accelerometer consists mainly of a uniform cantilever beam fixed to an accelerometer housing, which in turn is attached to the structure, the parameters of which are to be detected and measured. As the accelerometer vibrates due to base excitation, the cantilever tip oscillates about the undeformed axis, and the deflection at any point along the undeformed axis of the beam is a function of the excitation acceleration. It would be desirable to apply principles of the fiber tip based Fabry-Perot sensor to measurements of such a deflection of the oscillating beam.

Summarizing the discussion of the prior art supra, it is readily understood to those skilled in the art that it is still a long-lasting need in the field of active structural acoustical control and other fields mentioned previously to provide a wide bandwidth (in the frequency range of 50 Hz to 7.5 KHz and better) fiber tip based micro-optical sensor systems for various acoustic and vibration measurements, which are free of the disadvantages of prior art acoustics and vibration measurement systems.

SUMMARY OF THE INVENTION

It is an object of the present invention to provide a micro-scale optical sensor system for various measurements which may be used to detect acoustic and vibration fields in a broad frequency range, for example, 50 Hz to 7.5 KHz, or better extending to the MHz range.

It is another object of the present invention to provide fiber tip based Fabry-Perot sensor systems for active acoustic and vibration control, where fiber tip sensors are to be manufactured based on principles of MEMS fabrication in combination with low-coherence fiber-optic interferometry technique.

According to the teachings of the present invention, a micro-optical fiber based sensor system for acoustic or vibration measurements includes a pressure sensor, and/or a pressure gradient sensor, and/or a velocity sensor, and/or a deflection sensor, and/or an accelerometer sensor, and/or an acoustic intensity sensor, and combinations thereof.

The fiber-optic sensor system for acoustic measurements of the present invention is based on micro-optical principles and includes at least one sensor built on a silicon substrate having a diaphragm layer (metal or polymer layer with the thickness in the range of 100 nm-1 micrometer) formed to the top thereof. The substrate is photolithographically patterned to form fiber guides (one or a plurality) therein. An optical fiber is received in each of the fiber guides defined in the silicon substrate of the sensor. The fiber tip of the optical fiber received in the respective fiber guide is positioned from the diaphragm layer by a predetermined distance in order to form a sensing interferometer having a Fabry-Perot cavity defined between the fiber tip and the diaphragm layer. The fiber tip and the diaphragm layer are both optically reflective to form a pair of reflective surfaces of the sensing interferometer.

The structure of the present invention permits a great flexibility in building a sensing system, which provides for a single or a variety of acoustic and vibration measurements. For instance, an acoustic pressure sensor can be manufactured based on the principles of the present invention. As such, the acoustic pressure sensor includes a single silicon wafer with a single (for a single acoustic pressure measurement) or a plurality (for a plurality of acoustic pressure measurements) of fiber guides formed in the silicon wafer, as well as a plurality of optical fibers, each inserted in a respective fiber guide with the fiber tips thereof positioned a predetermined distance from the diaphragm layer formed on the silicon substrate. A processor (preferably, a personal computer) is coupled to a single or a plurality of optical fibers in order to calculate the acoustic pressure or displacement sensed by each sensing interferometer formed between the fiber tip and the respective diaphragm layer of the sensor.

In another implementation, the micro-optical sensor system for acoustic measurements of the present invention may be designed for pressure gradient measurements. In this implementation, a single substrate will have a pair of fiber guides with optical fibers in each of the fiber guides. The fiber guides will be formed photolithographically in the silicon wafer with a predetermined separation from one another, which is an important consideration for a pressure gradient measurement.

The sensor system of the present invention may also be used for displacement, velocity, and acceleration measurements. In the implementation for an acceleration measurement, the diaphragm layer of the top of the silicon substrate is patterned to form an inertial mass-spring structure deflectable under acoustic or vibratory excitation. The fiber tip of the optical fiber inserted in the fiber guide in the silicon wafer is positioned from the inertial mass-spring structure by a predetermined distance to form a Fabry-Perot cavity therebetween. Such a sensor senses and measures the displacement of the inertial mass-spring subjected to the excitation field, and based on such a displacement of the inertial mass-spring structure, the processing mechanism calculates the excitation acceleration of the structure.

The micro-optical sensor system for multiple acoustic measurements of the present invention includes a plurality of sensors and is implemented as a single unit consisting of a plurality of substrates, each photolithographically patterned to form fiber guides therein. Each substrate is covered with a diaphragm layer formed on the top of the substrate and the relative substrates are stacked each on the top of another in a manner that the respective fiber guides are aligned in these substrates as needed by the design of the multiple-sensor unit of the present invention. The optical fibers are inserted in the respective fiber guides (of a single substrate or in several fiber guides of the several substrates aligned with respect to each other). Fiber tips of each of the optical fibers are positioned from the respective diaphragm layer. In this manner, a multiplicity of sensing Fabry-Perot sensing interferometers are formed, each for sensing a respective one of the plurality of the acoustic (or vibration) parameters to be measured.

For example, a structure including a substrate with a pair of fiber guides and another substrate having a single fiber guide aligned with one of the fiber guides on the first substrate are stacked one to the other. One fiber is inserted in the aligned fiber guides of the first and second substrates while another optical fiber is inserted into a fiber guide of the first substrate. The fiber tip of both optical fibers are displaced from the respective diaphragm layers in order to form Fabry-Perot sensing interferometers between them. In this design, the diaphragm layer of the lower substrate is patterned to form the inertial mass-spring structure so that the optical fiber facing the inertial mass-spring structure transmits the acceleration signal to the processor. The optical fiber inserted in the aligned fiber guides of the first and second substrates transmits the signal corresponding to the acoustic pressure to the processor.

The principles of the micro-optical sensor system of the present invention may be extended to other acoustic parameters, such as for example, air particle velocity measurements, acoustic intensity measurements, etc.

The micro-optical sensor system further includes a light source, an integrated optical circuit phase (IOC) modulator coupled to the light source to modulate the light beam generated from the light source, a read-out interferometer built on the integrated optical circuit phase modulator (the read-out interferometer is path-matched to the sensing interferometer of each of the sensors), a photodetector coupled to each of the sensors in the micro-optical sensing arrangement, an integrated optical circuit that can be used to modulate the light beam by using a multi-step phase stepping algorithm. Data obtained from the photodetectors in synchronism with the multi-step phase stepping pattern is modulated. The light source may be in the form of a superluminescent light emitting diode or LED. The processor is coupled to the phase modulation-demodulation unit for controlling the multi-step phase stepping pattern and calculates phase signals of the sensors based on the obtained data.

Several patterns of networking the multiplicity of micro-optical fiber based Fabry-Perot sensors is contemplated within the scope of the present invention. In one such arrangement an optical switch is coupled in the circuitry to be connected to the plurality of micro-optical fiber based Fabry-Perot sensors for multiplexing.

Each of the photodetectors is coupled to a corresponding micro-optical sensor. The outputs of the photodetectors are connected to a data acquisition mechanism which may include a 12-bit National Instruments Digital Acquisition Board (or an equivalent one or one with higher precision) capable of being triggered to record the intensity (output of each photodetector) every $\pi/2$ radians of the modulation signal.

The modulation signal is a discrete sawtooth wave generated from the digital-to-analog output of the personal computer. In every period of the modulation signal, four digital voltages are generated and used to drive four step modulated phase values from the IOC phase modulator based on a calibration curve. The modulated phases are then added to the sensor phase change. The combined phase signal is detected by the high speed photodetector and sent to the analog-to-digital input of a personal computer.

On the demodulation side of the phase modulation-demodulation mechanism, the optical intensity output from the photodetectors is sampled four times during each period of the modulation signal. The data acquisition mechanism records the intensity every $\pi/2$ radians of the modulation signal. When the depth of modulation is set to $3\pi/2$ and the sampling rate is synchronized with the modulation frequency, the four consecutive optical intensity measurement yields the following:

$$I_0 = A + B \cos(\Delta\phi_s + 0) = A + B \cos(\Delta\phi_s),$$

$$I_1 = A + B\cos\left(\Delta\phi_s + \frac{\pi}{2}\right) = A - B\sin(\Delta\phi_s),$$

$$I_2 = A + B \cos(\Delta\phi_s + \pi) = A - B \cos(\Delta\phi_s),$$

$$I_3 = A + B\cos\left(\Delta\phi_s + \frac{3\pi}{2}\right) = A + B\sin(\Delta\phi_s).$$

The sensor phase is then determined by the processor from these four intensity values by using the following arc-tangent function:

$$\Delta\phi_s = \tan^{-1}\left(\frac{I_3 - I_1}{I_0 - I_2}\right)$$

The pressure of the excitation field is determined based on such obtained sensor phase.

Preferably, the read-out interferometer is a Mach-Zehnder interferometer. All connections between the fiber tip based Fabry-Perot sensors, photodetectors, and the IOC phase modulator are through optical couplers.

In each sensor, the fiber tip is coated with a $TiO_2$ film or polished appropriately to make a partial mirror for the Fabry-Perot cavity of the sensing interferometer. The distance between the fiber tip and the diaphragm layer may be adjusted and preferably is in the range of approximately 60 microns.

The present invention is further directed to a method of fabricating a micro-optical sensor system for acoustic measurements which includes the steps of:

forming a first diaphragm layer on the first surface of a first substrate, patterning the first substrate to form a first fiber guide therein, inserting a first optical fiber in the first fiber guide, and positioning a fiber tip of the first optical fiber a predetermined distance from the first diaphragm layer, thus forming a first sensing interferometer having a Fabry-Perot cavity defined between the fiber tip and the first diaphragm layer. The fiber tip and the diaphragm layer are both optically reflective to form a pair of reflective surfaces of the first sensing interferometer.

The method further includes the steps of:

patterning the first substrate to form a second fiber guide therein, forming a second diaphragm layer on a first substrate surface of the second substrate, patterning the second substrate to form a third fiber guide therein, attaching the second substrate to the first diaphragm layer of the first substrate, aligning the third fiber guide and the first fiber guide, inserting the first optical fiber in the third fiber guide through the first fiber guide, positioning the fiber tip of the first optical fiber a predetermined distance from the second diaphragm layer to form the first sensing interferometer, inserting a second optical fiber in the second fiber guide of the first substrate, and displacing the fiber tip on the second optical fiber a predefined distance from the first diaphragm layer to form a second sensing interferometer having a Fabry-Perot cavity defined between the fiber tip of the second optical fiber and the first diaphragm layer.

In a similar fashion more than two substrates may be patterned to form the needed fiber guides therein and stacked together. More than two optical fibers may be inserted in the resulting multi-substrate sensing unit to form a multi-sensor micro-optical sensing system that provides measurement of multiple acoustic and/or vibration parameters.

These and other novel features and advantages of this invention will be fully understood from the following detailed description of the accompanying Drawings.

BRIEF DESCRIPTION OF THE DRAWINGS

FIGS. 5A-5H show the sequence of steps for fabrication of combined sensor systems for acceleration and pressure;

FIG. 5I shows a patterned diaphragm layer;

DETAILED DESCRIPTION OF THE PREFERRED EMBODIMENTS

Figure 1:
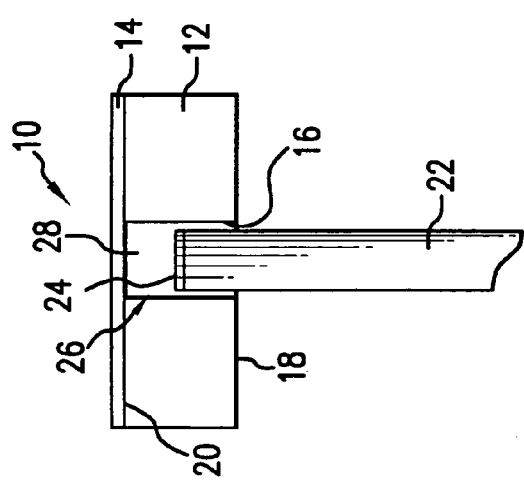
FIG. 1 is a schematic representation of the micro-optical pressure sensor in accordance with the principles of the present invention.

Referring to FIG. 1, a pressure sensor 10 of the present invention is shown which includes a silicon wafer 12 with a thin layer 14 formed of a metal or a polymer with a thickness in the range of 100 nm-1 µm, referred hereinto as a diaphragm layer 14. The silicon wafer 12 is patterned to form a fiber guide 16 which extends through the width of the silicon wafer 12 between a bottom surface 18 and the top surface 20 thereof. An optical fiber 22 is received in the fiber guide 16 with the tip 24 displaced from the diaphragm layer 14 by a predetermined distance which may be adjusted as needed. The fiber tip 24, as well as the diaphragm layer 14, are formed optically reflective for the purposes described infra herein. In the pressure sensor 10, as shown in FIG. 1, a sensing fiber tip based interferometer 26 is formed and this interferometer has a Fabry-Perot cavity 28 between the fiber tip 24 and the diaphragm layer 14. The optically reflective fiber tip and the diaphragm 14 form a pair of reflective surfaces of the sensing interferometer 26.

Figure 2:
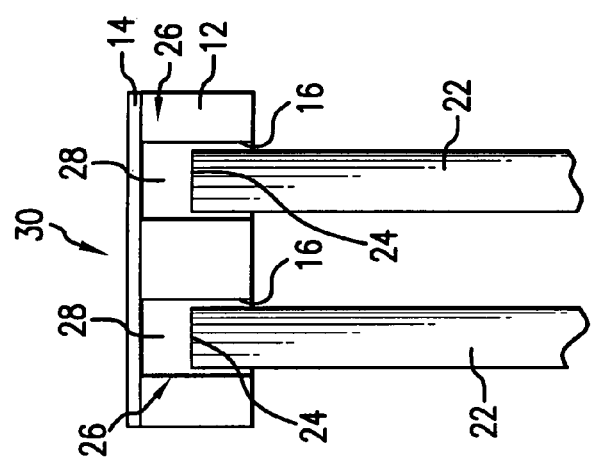
FIG. 2 is a schematic representation of the micro-optical pressure gradient sensor of the present invention.

Referring to FIG. 2, a pressure gradient sensor 30 is shown which includes a silicon wafer 12 covered with the diaphragm layer 14. The pressure gradient sensor 30 has two fiber guides 16 formed in the silicon wafer 12 in which a pair of optical fibers 22 are received. The fibers 24 have their respective fiber tips 24 displaced from the diaphragm layer 14 to form a pair of sensing interferometers 26 each having a Fabry-Perot cavity 28 defined between the fiber tip 24 and the diaphragm layer 14. The sensor 30 shown in FIG. 2, may be used as a pressure gradient sensor as well as the sensor for multiple acoustic pressure measurements. The sensor 30 also may be used as a one-dimensional particle velocity sensor or as a part of a multi-dimensional air particle velocity sensor, as will be presented infra herein.

Figure 3:
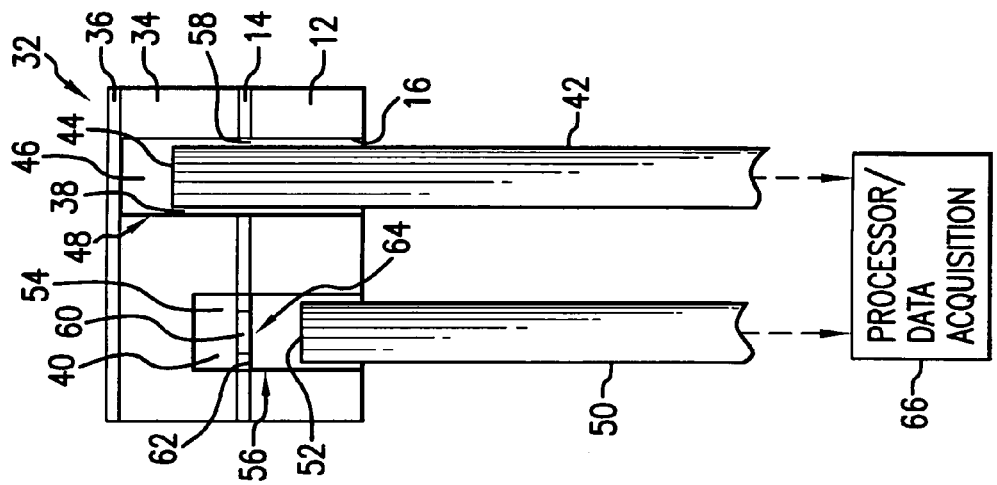
FIG. 3 is a schematic representation of a micro-optical sensor for combined measurements of acceleration, displacement, and acoustic pressure.

Referring to FIG. 3, a sensing unit 32 for measurements of both pressure and acceleration is shown. The sensing unit 32 includes the silicon wafer 12 having the diaphragm layer 14 formed on the top surface 20 thereof. A pair of fiber guides 16 is formed in the wafer 12 for receiving two optical fibers 22. The combined pressure/acceleration sensor 32, as shown in FIG. 3, further includes another silicon wafer 34 which is covered with the diaphragm layer 36. A fiber guide 38 is formed in precise alignment with one of the fiber guides 16. The wafer 34 also has a clearance cavity 40 extending partially through the width of the wafer 34 for purposes to be explained in further paragraphs. The optical fiber 42 is received in both fiber guides 38 and 16. The fiber tip 44 of the optical fiber 42 is displaced from the diaphragm layer 36 to form a Fabry-Perot cavity 46 of the sensing interferometer 48.

Another optical fiber 50 is received in the fiber guide 16 of the silicon wafer 12. The fiber tip 52 of the optical fiber 50 is displaced from the diaphragm layer 14 formed on the top of the silicon wafer 12 to define a Fabry-Perot cavity 54 of the sensing interferometer 56 of the pressure/acceleration sensor 32.

As seen, in FIG. 3, the pressure/acceleration sensor 32 includes a pair of sensors each having a sensing interferometer with the Fabry-Perot cavity defined between the fiber tip of the respective optical fiber and the respective diaphragm layer. The sensor based on the sensing interferometer 48 senses pressure, while the sensor based on the sensing interferometer 56 senses acceleration.

In order to implement the pressure/acceleration sensor 32 of FIG. 3, the diaphragm layer 14 on the top of the silicon wafer 12, is patterned to have an opening 58 to free the path between the fiber guides 38 and 16 for the optical fiber 42. The diaphragm layer 14 further includes an inertial mass 60 and a spring 62, both forming an inertial mass-spring structure 64. The fiber tip 52 is spaced from the inertial mass-spring structure 64 in order to form the Fabry-Perot cavity 54 therebetween. The inertial mass-spring structure 64 has a reflective surface so that reflective mirrors of the Fabry-Perot cavity 54 are formed by the reflective surface of the structure 64 and the reflective fiber tip 52.

The clearance cavity 40 formed in the wafer 34 provides some clearance for the inertial mass to vibrate when the diaphragm layer 14 is subjected to an acoustic or a vibratory excitation. As will be described in detail infra herein, the sensor 32 senses the deflection of the inertial mass 60 subjected to the acoustic or vibratory excitation, and acceleration is calculated based on the measurement of the displacement of the inertial mass. In this manner, the optical fiber 42 transmits a signal proportional to the acoustic pressure, while the optical fiber 50 transmits a signal proportional to the acceleration to a processor/data acquisition unit 66 to be further described.

It is to be understood that the pressure-acceleration sensor 32 as described is only one example, and other combinations of micro-optical fiber based sensors are contemplated within the scope of the present invention. For instance, the sensing system of the present invention may include many micro-optical pressure sensors, the pressure gradient/acceleration sensor, pressure gradient/velocity sensor, etc. For each design, the fabrication process may be adjusted accordingly and the structure may include more than two silicon wafers which are patterned in accordance with the overall design of the micro-optical sensing structure.

Figure 4A:
FIGS. 4A-4C illustrate the sequence of steps for fabrication of the micro-optical fiber-based sensor for measurement of either a pressure gradient or pressure at two locations.
Figure 4B:
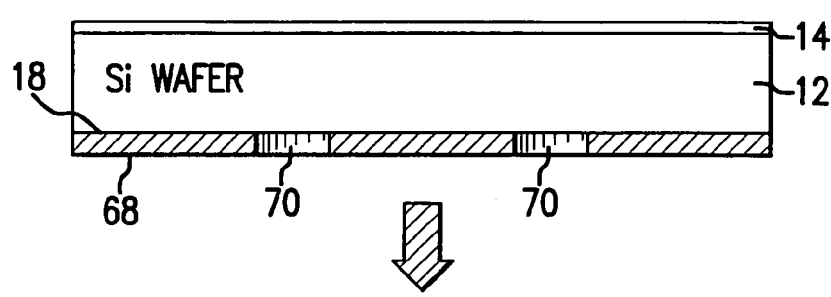
Figure 4C:
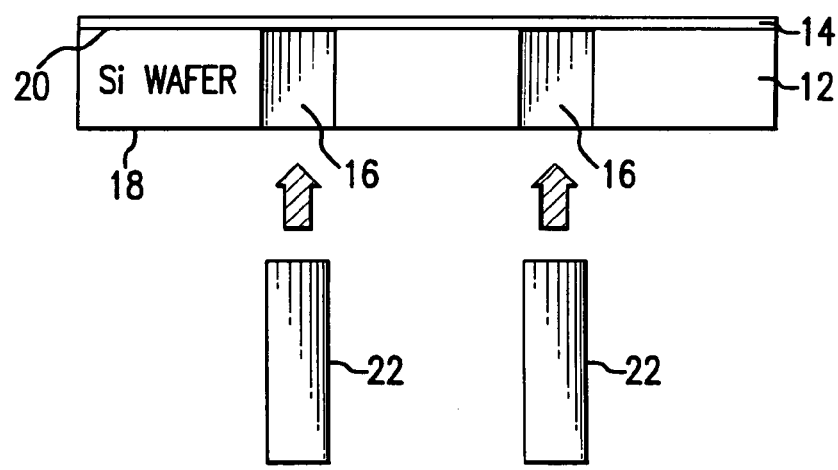

Referring to FIGS. 4A-4C, a manufacturing process for creating a pressure gradient sensor shown in FIG. 2 is presented. In FIG. 4A, the silicon wafer 12 is covered with the diaphragm layer 14 (metal or polymer layer with thickness in the range of 100 nm-1 μm) that serves the function of a mirror for the Fabry-Perot cavity. The diaphragm layer 14 may be deposited on the top surface of the silicon wafer 12 by any method known to those skilled in the art, such as for example, chemical vapor deposition, electronic beam evaporation, sputter deposition, etc.

In FIG. 4B, the bottom surface 18 of the silicon wafer 12 is covered with a photoresist 68 and openings 70 are uncovered in the photoresist layer 68 at areas where the fiber guide 16 are to be formed. Further, upon the photolithography step being performed, a Deep Reactive Ion Etching (DRIE), or other etching processes, may be carried out to form the fiber guide 16. After the fiber guides 16 are formed in the silicon wafer 12 the photoresist layer 68 is removed and the optical fibers 22 are inserted into the fiber guides 16 so that the fiber tip 24 of each fiber 22 is appropriately positioned from the diaphragm layer 14 to form a Fabry-Perot cavity 28.

In order to form the pressure/acceleration sensor 32, shown in FIG. 3, in continuation of the fabrication process of FIGS. 4A-4C, another wafer 34 is covered with a diaphragm layer 36 (FIG. 5A). Further, as shown in FIG. 5B, a photoresist layer 72 is deposited on the bottom surface 74 of the silicon wafer 34 and the openings 76 are uncovered at the areas where the fiber guide 38 and the clearance cavity 40 are formed. In the next step, shown in FIG. 5C, the Deep Reactive Ion Etching is performed until the clearance cavity 40 is formed and a portion 78 of the fiber guide 38 is etched. If the entire portion of the fiber guide 38 can be etched, then steps 5D and 5E described next will not be needed.

To complete the etching of the fiber guide 38, as further shown in FIG. 5D, in order to etch the portion 78 of the fiber guide 38 through the entire width of the silicon wafer 34 another photolithographical step is performed in which the bottom surface 74 of the wafer 34 is covered with the photoresist layer 80 and an opening 82 is uncovered therein. The opening 82 is aligned with the portion 78 of the fiber guide 38. Upon the opening 82 being uncovered, the silicon wafer 34 is subjected to the Deep Reactive Ion Etching to etch the silicon wafer 34 throughout the entire width thereof in order to form the fiber guide 38 which extends between the bottom surface 74 and the upper surface 84 of the wafer 34. Subsequently, the photoresist layer 80 is removed. As further shown in FIG. 5H, the patterned silicon wafer 34 is stacked on the top of the patterned silicon wafer 12 in order to form a combined multi-parameter sensor, which may be an acceleration/pressure sensor 32.

It is to be understood that before the wafer 34 is attached to the top of the wafer 12, the diaphragm layer 14 of the wafer 12 is patterned to form the inertial mass-spring structure 64 and the opening 58 by a photolithography process well known to those skilled in the art. As shown in FIG. 5F, this process includes the step of covering the diaphragm layer 14 with a photoresist layer 86 and patterning the photoresist layer 86 to form openings at predetermined areas thereof for further etching of the inertial mass-spring structure 64 and the opening 58 therein. FIG. 5I illustrates the patterned diaphragm 14 having the opening 58 and the structure 64 which includes the inertial mass 60 and the spring 62. As shown in FIG. 5G, the photoresist layer 86 is further removed from the top of the layer 14 to prepare the thus patterned diaphragm layer 14 on the silicon wafer 12 to receive the silicon wafer 34 on the top thereof. Then, as shown in FIG. 5H, the optical fibers 50 and 42 are inserted into the respective fiber guides 16 and 38 to result in the sensing unit 32.

The sensor diaphragm layer is the same size as the single mode fiber with cladding (125 micrometer) and a thickness of the diaphragm from 100 nm to 1 μm. In the structure having multiple fiber based Fabry-Perot sensors, the separation between the sensors may be adjusted based on the application requirements.

The principles of fiber based measurements will be further explained with reference to FIG. 6, where a pressure sensor system 90 for the acoustic measurements includes a sensor, for instance, the sensor 10, having the diaphragm 14 and the sensor interferometer 26. In order to determine the parameters of a mechanical element 92 which undergoes displacement or strain, the diaphragm 14 of the sensor 10 oscillates under the influence of pressure P. The sensor interferometer 26 is a Fabry-Perot interferometer. The cavity length of the interferometer, $\Delta L$ changes according to diaphragm fluctuations which permits determination of the mechanical element's parameters. Therefore, the cavity length change $\Delta L$ is the parameter which may serve to determine the acoustic pressure P.

A read-out interferometer 94 is path-matched to the sensing interferometer 26 as will be described in detail infra. The cavity length change $\Delta L$ signal is coupled to optical elements 96 that includes photodetectors. The received signal (intensity at the output of the photodetectors) is decoded by a phase modulation and demodulation scheme 98 to determine the optical phase change $\Delta \phi$ which is a function of $\Delta L$, and thus is related to (sound) pressure in accordance with a predetermined relationship which may be calculated.

Figure 7A:
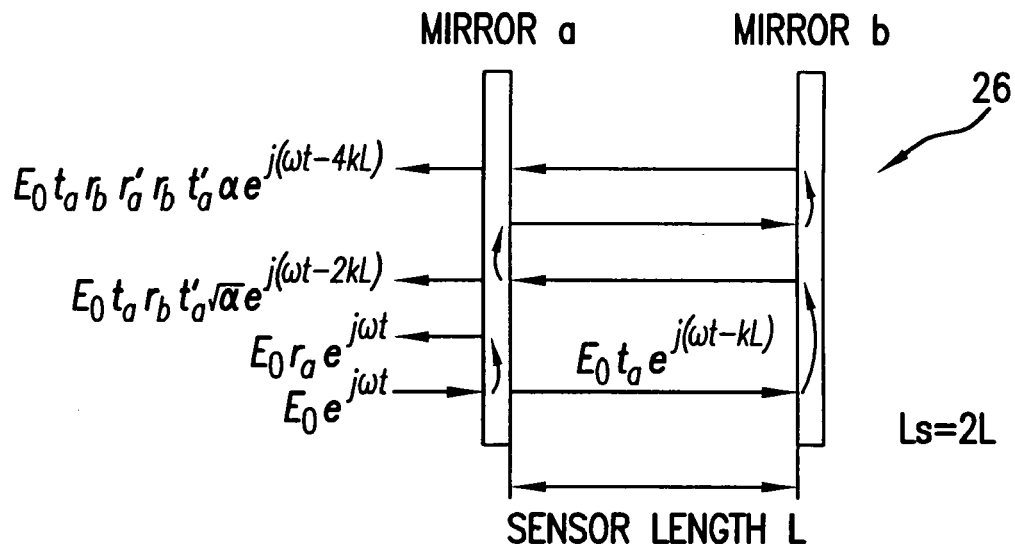
FIGS. 7A and 7B show schematically the Fabry-Perot sensor interferometer and Mach-Zehnder read-out interferometer employed in the micro-optical sensing system of the present invention.

The sensing system 90 of the present invention is based on a low finesse Fabry-Perot (FP) cavity shown in FIG. 7A. After the light emerges from the single mode fiber, the electric field components in the multi-beam interference with Gaussian beam expansion-induced power attenuation may be modeled as:

$$E_{1r}=E_0 r'_a e^{j\omega t},$$

$$E_{2r}=E_0 t_a r_a t'_a \sqrt{\alpha} e^{j(\omega t-2kL)}, \text{ and}$$

$$E_{3r}=E_0 t_a r_b r'_a r'_b t'_a (\sqrt{\alpha})^2 e^{j(\omega t-4kL)} \quad (1)$$

where $r_a$, and $r'_a$ are the reflection coefficients of the mirror a, and $r_b$, $r'_b$ are the reflection coefficients of the mirror b, respectively, and $t_a$ and $t'_a$ are the transmission coefficients of the mirror a. It is noted that $r_a$ and $t_a$ are for waves traveling from glass towards air, while $r'_a$ and $t'_a$ are for waves traveling from air towards glass. $\alpha$ is the power attenuation factor, which is defined as the fraction of the power coupled back into the single mode fiber after a roundtrip 2L through the FP cavity. The wave number is
k is equal to $2\pi/\lambda$. The resultant reflected scalar E wave is given by $$E_r = E_0 e^{j\omega t}\sqrt{R_a}\left[1 - \frac{1-R_a}{R_a}\sum_{m=1}^{\infty}(-1)^m (R_a R_b \alpha)^{\frac{m}{2}} e^{-2jmkL}\right], \quad (2)$$

where $r_a = -r'_a = \sqrt{R_a}$ and $t_a t'_a = \sqrt{T_a}, r_b = \sqrt{R_b}$,

R and T are reflectivity and transmittivity, respectively.

The transfer function $H_r$ of the Fabry-Perot interferometer may be written as $$H_r^s = \frac{E_r \cdot E_r^*}{E_i \cdot E_i^*} = A_0 - A_1 \cdot \sum_{m=1}^{\infty}(R_a R_b \alpha)^{\frac{m}{2}} \cdot \cos(2mkL_s), \quad (3)$$

where $$A_0 = R_a + \frac{(1-R_a)^2 R_b \alpha}{(1-R_a R_b)}, \text{ and } A_1 = \frac{2(1-R_a-R_b\alpha+R_a R_b\alpha)}{R_a R_b \alpha - 1} \quad (4)$$

For low finesse Fabry-Perot sensor, also referred herein to as FP sensor, the transfer function may be written:

$$H_r^s = A_0 - A_1 \cdot \sqrt{R_a R_b}\alpha \cos(kL_s). \quad (5)$$

Figure 6:
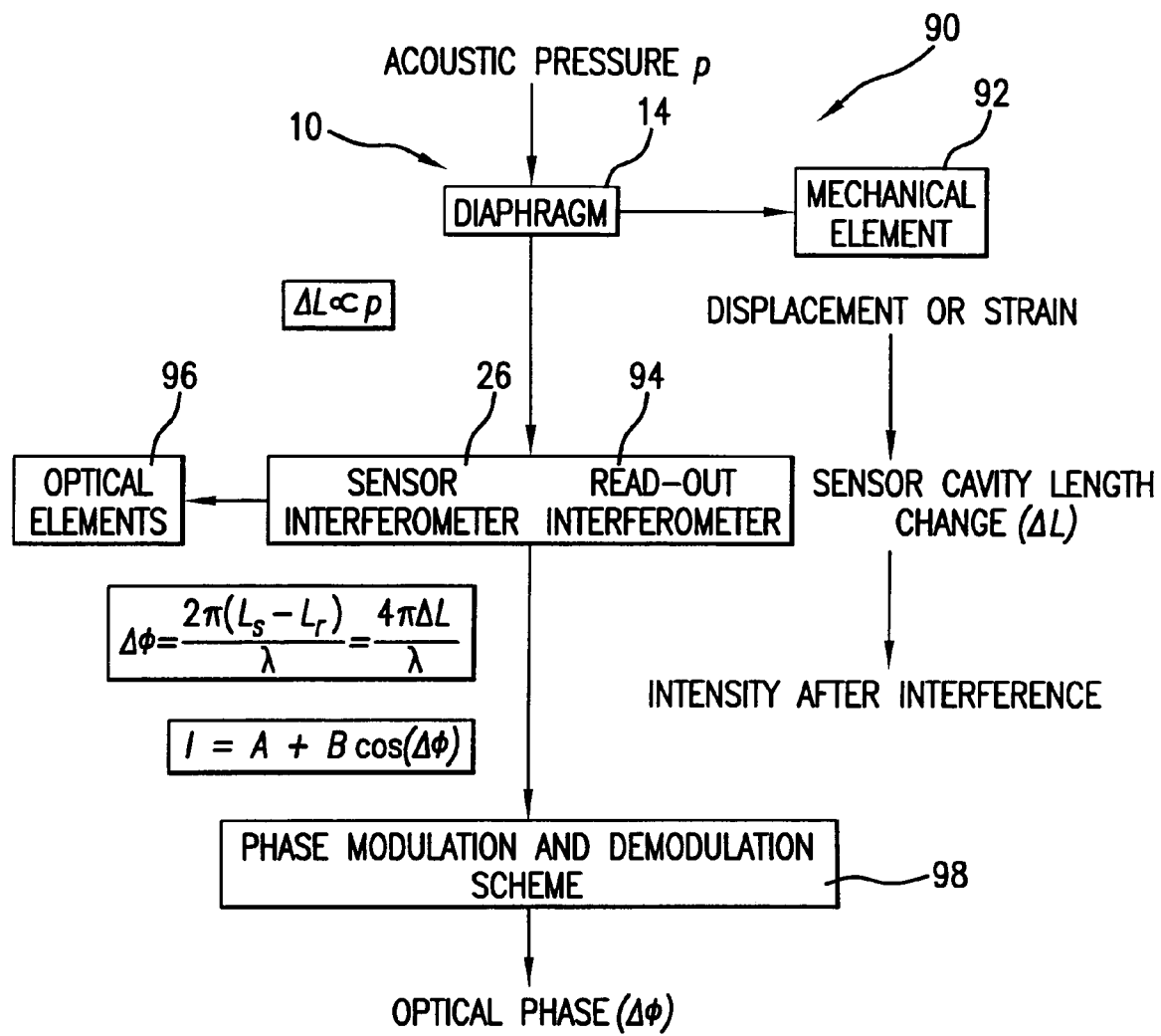
FIG. 6 is a block diagram of the sensor system designed for acoustic measurements of the present invention.
Figure 7B:
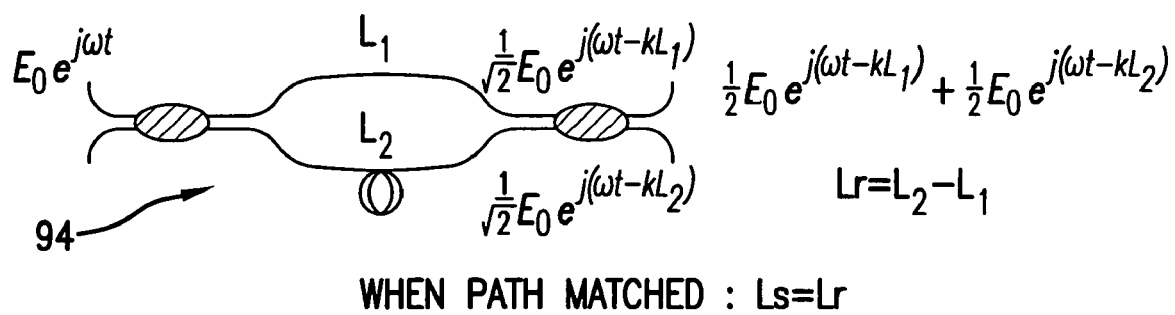
Figure 8:
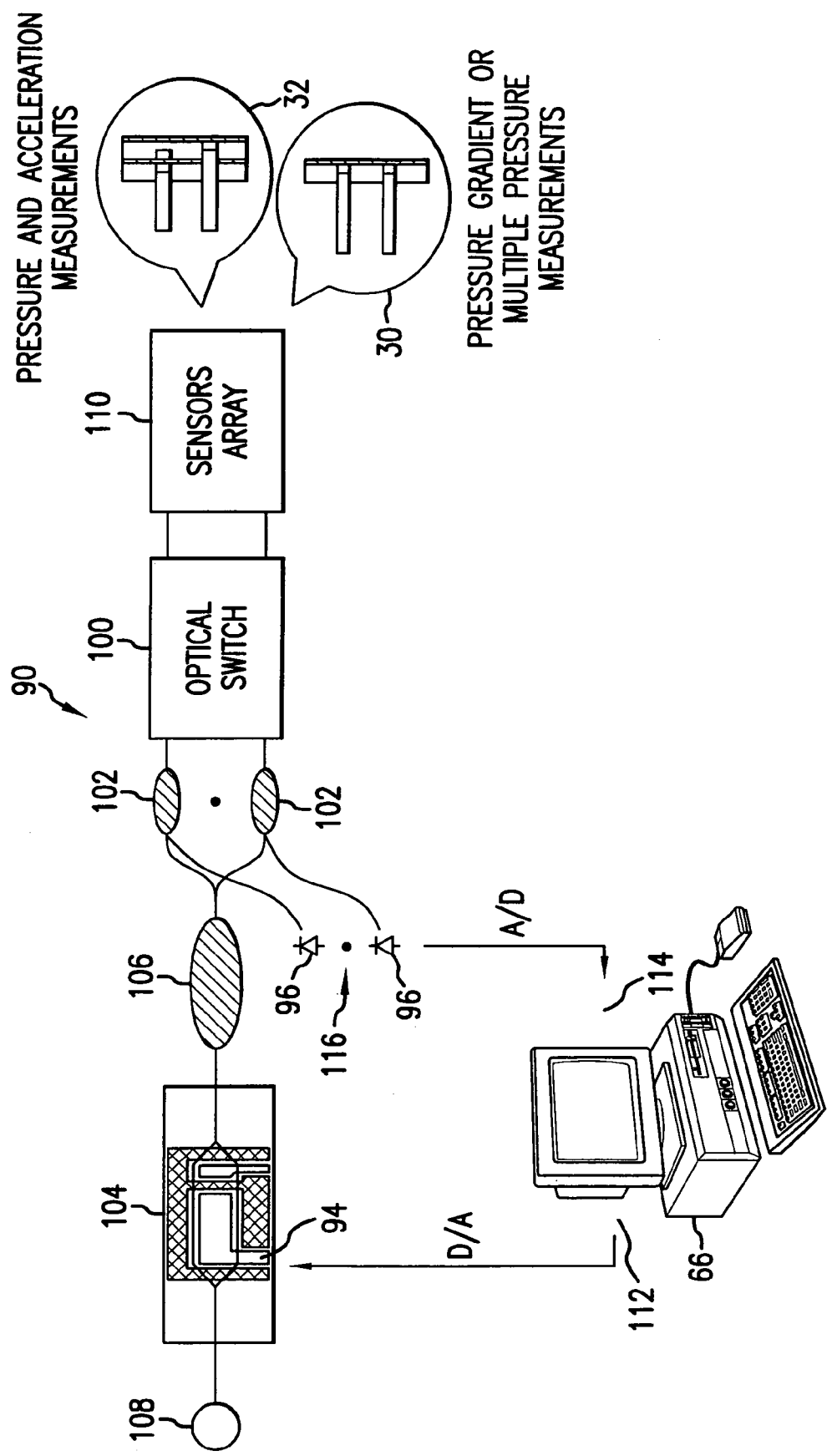
FIG. 8 is a schematic representation of the sensor system of the present invention.

As best shown in FIGS. 6 and 8, a path matched differential interferometry (PMDI) system is designed to demodulate the FP sensor 10. In this PMDI system, the read-out interferometer 94 is path-matched to the sensing interferometer 26. The read-out interferometer 94 may be a Mach-Zehnder interferometer, as shown in FIG. 7B. Then the associated transfer function is $$H_r^r = \frac{E_r \cdot E_r^*}{E_i \cdot E_r^*} = \frac{1}{2}[1 + \cos k(L_2 - L_1)] = \frac{1}{2}[1 + \cos kL_r], \quad (6)$$

where $L_r$, is the cavity length of the read-out interferometer 94. When the light passes through the PMDI system, the resulting time dependent intensity function of the sensors 10, $I_T$, as detected by a photodetector 96 shown in FIG. 8, is given by:

$$I_T = \frac{1}{4}\int H_r^r H_r^s i(k)dk, \quad (7)$$

where $H_r^s$ and $H_r^r$, which are the transfer functions of the FP sensor interferometer 26 and the Mach-Zehnder read-out interferometer 94 are given by equations (5) and (6), respectively, and
i(k) is the input spectrum of the broadband optical source. After carrying out the integration, equation (7) can be written:

$$I_t \approx \frac{1}{8}I_0 A_0 - \frac{1}{8}I_0 A_1 \sqrt{R_a R_b}\alpha \cos k_0 L_s e^{-\left(\frac{\pi L_s}{L_c}\right)^2} + \quad (8)$$
$$\frac{1}{8}I_0 A_1 \cos k_0 L_r e^{-\left(\frac{\pi L_r}{L_c}\right)^2} -$$
$$\frac{1}{16}I_0 A_1 \sqrt{R_a R_b}\alpha \left\{\cos k_0(L_s + L_r)e^{-\left[\frac{\pi(L_s+L_r)}{L_c}\right]^2} + \right.$$
$$\left. \cos k_0(L_s - L_r)e^{-\left[\frac{\pi(L_s-L_r)}{L_c}\right]^2}\right\},$$

where
$L_c$ is the coherence length of the short coherence light source and $\Delta^\lambda$ represents the half-width of the linewidth. When the system is path matched
$(L_r \approx L_s)$ and
$L_c$ is much smaller than
$L_r$ and
$L_s$, coherent interference occurs only in the
$(L_s - L_r)$ component. Thus equation (8) can be simplified as:

$$I_t \approx \frac{1}{8}I_0 A_0 - \frac{1}{16}I_0 A_1 \sqrt{R_a R_b}\alpha \cos k_0(L_s - L_r) \quad (9)$$

Referring to FIG. 8, the system 90 of the present invention includes one or a plurality of micro-optical fiber tip based Fabry-Perot sensors, such as the pressure sensor 10, and/or the pressure gradient sensor 30, and/or the pressure/acceleration sensor 32 in any combination thereof. An optical switch 100 may be provided to which the micro-optical fiber tip based Fabry-Perot sensors are coupled by the optical fibers 22, 42, and/or 50. This creates N channels (corresponding to the number of the sensors in the system 90), the signals of which are demultiplexed by using the optical switch 100. The system 90 further includes an array of optical couplers 102 which couples the optical fibers to the array of the photodetectors 96.

A coupler 106 couples the read-out interferometer 94 built-in an Integrated Optical Circuit (IOC) phase modulator 104 to the optical fibers 22, 42, and 50 of the sensors. The IOC phase modulator 104, particularly the read-out interferometer 94 portion thereof along with the sensing interferometer 26 of each sensor creates a Path Matched Differential Interferometry (PMDI) system for demodulating signals from the sensors.

A Superluminescent Light Emitting Diode (SLD) source 108 generates a light beam for the system 90 of the present invention. Thus, the system 90 of the present invention includes the SLD source 108, the IOC phase modulator 104, 2×2 optical couplers 102 and 106, 1×N optical switch 100, the FTFP sensors array 110, the array 116 of the photodetectors 96, and the personal computer (PC) based processor and data acquisition system 66.

The advantage of using the optical switch 100 for Spatial Division Multiplexing (SDM) is that a larger number of sensors 10, 30, 32 can be detected by using the same base optical system (i.e., the SLD source 108, photodetector 96, and the modulator 104). Furthermore, each sensor 10, 30, 32 may be designed to either sense an acoustic field at a particular location of the studied structure or to sense a particular acoustic frequency in such a system.

The sensor array 110 may include any combination of sensors, described supra with regard to FIGS. 1-5H. It may be the pressure/acceleration sensor 32, and/or air particle velocity (pressure gradient) sensor 30, etc. In each sensor, the fiber tip is spaced from the diaphragm layer by approximately 60 microns, which is half of the imbalance length in the IOC phase modulator 104. The fiber tip is coated with the $TiO_2$ film by, for example of a SOL-GEL process which is used to form the $TiO_2$ mirror on the entire cross-section of the optical fiber in order that the reflectivity of the fiber tip may be increased up to 30%. An alternate means to coat the fiber tip can be based on vapor deposition techniques.

The sensor diaphragm 14 may be contemplated as a circular plate membrane system with a fixed edge. The relationship between the displacement of the diaphragm and the pressure experienced by the diaphragm is determined as follows:

For an isotropic circular plate of radius a and thickness h, the first natural frequency of the diaphragm may be written as $$f = \frac{10.21}{2\pi a^2}\left[\frac{Eh^2}{12\rho(1-v^2)}\right]^{1/2} \tag{10}$$

For forced oscillations, the governing equation is of the form:

$$D\nabla^4 w + \rho h \frac{\partial^2 w}{\partial t^2} - N_0 \nabla^2 w + \text{damping term} = p(r, \theta; t) \tag{11}$$

where
$p(r,\theta;t)$ is the dynamic sound pressure to be sensed with amplitude of
p,
$\rho$ is density of the diaphragm material,
$v$ is Poisson ratio,
$N_0$ is the initial plate tension, and $$D = \frac{Eh^3}{12(1-v^2)}.$$

The solution of equation (11) may be written as:

$$w(r, \theta, t) = \sum_{k=0}^{\infty} \eta_k(t) W_K(r, \theta), \tag{12}$$

where
$\eta_k$ are the modal amplitudes and
$W_k$ are the mode shapes determined from the free-vibration problem. Taking advantage of the orthogonality of the modes, for a harmonic loading, equation (11) is reduced to:

$$\ddot{\eta}_k + 2\zeta_k \omega_k \dot{\eta}_k + \omega_k^2 \eta_k = F_k f(t), \tag{13}$$

where
$\omega_k$ is the natural frequency of the kth mode of interest and
$\zeta_k$ is the associated modal damping coefficient; the different coefficients in equation (13) are given by $$\zeta_k = \frac{\mu}{\rho \omega_k}, \quad F_k = \frac{1}{\rho h N_k}\int_0^a p W_k(r,\theta) 2\pi r\, dr, \tag{14}$$

-continued $$\text{and } N_k = \int_0^a 2\pi r W_k^2(r,\theta)\, dr$$

For harmonic excitation, the solution of equation (13) may be written as $$\eta_k(t) = \hat{\eta}_k e^{j(\omega t - \phi_k)}, \tag{15}$$

where the amplitude function is calculated as:

$$\hat{\eta}_k = \frac{F_k}{\omega_k^2 \sqrt{\left[1-\left(\frac{\omega}{\omega_k}\right)^2\right]^2 + 4\zeta_k^2\left(\frac{\omega}{\omega_k}\right)^2}} \tag{16}$$

Approximating the response given by equation (12) in terms of a single mode, here, the first mode, the displacement response amplitude is written as $$w(r,\theta) = \hat{\eta}_0 W_0(r,\theta), \tag{17}$$

where $$W_0(r,\theta) = A[J_0(kr)I_0(ka) - I_0(kr)J_0(ka)] \tag{18}$$

From equations (14) to (18), the displacement response is determined to be $$w(r,\theta) = \tag{19}$$

$$\frac{2\pi Pa}{\rho h \bar{N}_\theta k} \frac{[J_1(ka)I_0(ka) - I_1(ka)J_0(ka)][J_0(kr)I_0(ka) - I_0(kr)J_0(ka)]}{\omega_k \sqrt{\left[1-\left(\frac{\omega}{\omega_k}\right)^2\right]^2 + 4\zeta_k^2\left(\frac{\omega}{\omega_k}\right)^2}}$$

where:

$$\bar{N}_\theta = \int_0^a 2\pi r [J_0(kr)I_0(ka) - I_0(kr)J_0(ka)]^2\, dr \tag{20}$$

For a FTFP sensor, the cavity length change is due to the deflection of the diaphragm center $w_0$. Hence, the optical phase change $\Delta\phi$ is related to the sound pressure as $$\Delta\varphi = \frac{4\pi n}{\lambda} w(r,\theta) = \tag{21}$$

$$\frac{8\pi^2 nPa}{\lambda \rho h \bar{N}_\theta k} \frac{[J_1(ka)I_0(ka) - I_1(ka)J_0(ka)][I_0(ka) - J_0(ka)]}{\omega_k \sqrt{\left[1-\left(\frac{\omega}{\omega_k}\right)^2\right]^2 + 4\zeta_k^2\left(\frac{\omega}{\omega_k}\right)^2}}$$

where
n is the reflective index of the cavity material and $\lambda$ is the wavelength of light source. For complete analysis, refer to the dissertation of Yu, M. (2002) "Fiber Optic Systems for Acoustic Measurements", Univ. of Maryland, College Park.

The above equation (21) is used to describe how the sound pressure deflects the diaphragm and how this resulting deflection produces an optical phase change in the FTFP sensor. To extract the phase from the optical sensor output, the phase demodulation system 98, shown in FIG. 6, which includes the IOC phase modulator 104 is employed.

The phase modulation-demodulation system 98 shown in FIG. 1 implemented for the current sensor design, is a PC-based pseudo-heterodyne scheme based on a four-step phase-stepping algorithm. In this scheme, the optical signal generated by the SLD source 108 is modulated by the IOC phase modulator 104 instead of a traditional PZT modulator. This technique offers numerous advantages: a) high optical output power, b) large frequency range (up to 3 GHz), c) rejection of electrical noise, d) high dynamic range, and e) very high stability.

Referring to FIG. 8, the modulation signal which is a discrete sawtooth wave is generated from the digital-to-analog output 112 of the PC 66. In every period of the modulation signal, four digital voltages are generated and used to drive four step modulated phase values from the IOC phase modulator 104. Subsequently, the modulated phases are added to the sensor phase change. The combined phase signal is detected by the high speed photodetector 96 and sent to the analog-to-digital input 114 of the PC 66. The modulation frequency used is 100 kHz and the depth of modulation is approximately $3\pi/2$.

In order to demodulate the received signal, the optical intensity detected by a micro-optical sensor is to be sampled four times during each period of the modulation signal. A 12-bit National Instruments digital acquisition board (or an equivalent one or one with a higher precision) is then triggered to record the intensity every $\pi/2$ radians of the modulation signal. When the depth of modulation is set to $3\pi/2$ and the sampling rate is synchronized with the modulation frequency, the four consecutive optical intensity measurements yield the following:

$$I_0 = A + B\cos(\Delta\phi_s + 0) = A + B\cos(\Delta\phi_s),$$

$$I_1 = A + B\cos\left(\Delta\phi_s + \frac{\pi}{2}\right) = A - B\sin(\Delta\phi_s),$$

$$I_2 = A + B\cos(\Delta\phi_s + \pi) = A - B\cos(\Delta\phi_s),$$

$$I_3 = A + B\cos\left(\Delta\phi_s + \frac{3\pi}{2}\right) = A + B\sin(\Delta\phi_s). \quad (22)$$

The sensor phase is then determined from these four intensity values by using the following arc-tangent function:

$$\Delta\phi_s = \tan^{-1}\left(\frac{I_3 - I_1}{I_0 - I_2}\right) \quad (23)$$

Equation (23) provides a way to determine the phase signal the user is trying to detect. However, care has to be taken whenever the denominator in equation (23) passes through a zero node. Since, the inverse tangent function is multi-valued, the unwrapping algorithm, is written to detect this discontinuity, and either an addition or subtraction of a phase of $k\pi$ (where k is a integer multiple) from $\Delta\phi_s$ is carried out to maintain a continuous phase. The advantage of this algorithm is that the modulation frequency may be much higher than that used in the other techniques and the phase error is relatively low.

A large scale prototype (dimensions in mm) of the micro-optical sensor system based on Fabry-Perot principles shown in FIGS. 1-8 has been built and tested.

In the application system run, a condenser microphone (Bruel & Kjaer model #4134) was used as the reference sensor for validation. The input acoustic signal was generated by an Altec Lansing computer speaker system (Model No. ACS340). The diaphragm 14 of the FTFP sensor 12 was excited by using the speaker. The vibration changes the distance between the fiber tip and the diaphragm which is related to the optical phase change. In order to detect this unknown phase change the phase demodulation algorithm described supra was employed. The entire phase modulation and demodulation process was controlled by a PC-based digital signal processing program.

The fiber-optical sensor system was operated in a frequency range of approximately 50 Hz to 7.5 kHz by using sinusoidal sound signals. The sensor results have been compared to the results of a Bruel & Kjaer 4134 condenser microphone. Representative results from studies performed at 70 Hz, 2.3 kHz and 7.5 kHz have shown that the optical sensor data complies well with the condenser microphone data in both time domain and frequency domain. The above results are demonstrative of the applicability of the micro-optical FTFP sensor system of the present invention for pressure measurements. The studies show that the system may be used in the frequency range from 50 Hz to 7.5 kHz.

Operational results with macro-scale prototypes have shown that the sensor of the present invention can be used to capture the acoustic field with an acceptable accuracy and confirm the model predictions.

As disclosed supra, the micro-optical fiber tip based Fabry-Perot sensors may be used for detecting and measuring pressure and further may serve as a microphone. The fiber tip sensors of the present invention sense and permit measurement of the acoustic pressure (FIG. 1) both inside and outside enclosures. They may also be used in active acoustics and vibration control applications as pressure gradient sensors, air particle velocity sensors (FIG. 2), displacement, and acceleration sensors (FIG. 3). The velocity sensor of the present invention is based on the gradient pressure sensor 30, shown in FIG. 2. It includes two fiber tip microphones of the present invention disclosed supra in each direction of the XYZ coordinate system. For the sake of simplicity, further description of the velocity sensor of the present invention in only one direction is presented, however, the same procedure applies for a three-dimensional velocity sensor with some restrictions.

In a simplified model of the velocity sensor 30 of the present invention, two FTFP sensors 12 are formed in the same Si wafer, as shown in FIGS. 2, and 4a-4c.

For one-dimensional wave propagation, the governing equation is given by:

$$\frac{\partial p(x,t)}{\partial x} = -\rho_0 \frac{\partial u(x,t)}{\partial t} \quad (24)$$

where p(x,t) and u(x,t) are, respectively, the pressure and particle velocity at point x and time t, and $\rho_0$ is the medium mass density.

In order to construct the velocity sensor, the partial differential equation may be simplified by using finite difference schemes. Assuming that the distance between the two sensors in the wafer is l and the velocity is sampled time intervals $\delta t$ apart, if a second order central finite difference scheme is used for the spatial differentiation and a second order forward scheme is used for the time differentiation, Eq. (24) can be approximated in the following form:

$$\frac{p(l/2, t) - p(-l/2, t)}{l} = -\rho_0 \frac{3u(0, t) - 4u(0, t - \delta t) + u(0, t - 2\delta t)}{2\delta t} \quad (25)$$

from which, the air particle velocity at the origin is determined to be:

$$u(0, t) = \frac{1}{3}\left[4u(0, t - \delta t) - u(0, t - 2\delta t) - \frac{2\delta t}{\rho_0 l}[p(l/2, t) - p(-l/2, t)]\right] \quad (26)$$

These two finite difference schemes are chosen since they have errors of order $O(l^2)$ and $O(\delta t^2)$, respectively. In order to examine the error associated with the chosen schemes, the following analysis is carried out. Consider an incident wave at an angle $\theta$ with respect to the x-axis. The pressure magnitudes at the pressure microphones 12 located at $(-l/2)$ and $(l/2)$ are, respectively:

$$p\left(-\frac{l}{2}, t\right) = Pe^{j\left(\omega t + \frac{kl}{2}\cos\theta\right)} \quad (27)$$

$$p\left(\frac{l}{2}, t\right) = Pe^{j\left(\omega t + \frac{kl}{2}\cos\theta\right)}$$

where k is the wave number ($k=\omega/c$) and c is the sound speed in the medium. In these equations, the wave component parallel to the diaphragm plane (k y sin $\theta$) is neglected. This is acceptable for k a<<1, where a is the diameter of the diaphragm. Making use of Eqs. (27) on the left-hand side of Eq. (25) it is found:

$$\frac{p\left(\frac{l}{2}, t\right) - p\left(-\frac{l}{2}, t\right)}{l} = \frac{P}{l}e^{j\omega t}\left[j2\sin\left(\frac{kl}{2}\cos\theta\right)\right] \quad (28)$$

For a small incident angle and low frequency values (kl<1), this equation becomes, $$\frac{p\left(\frac{l}{2}, t\right) - p\left(-\frac{l}{2}, t\right)}{l} \approx jkP\cos\theta e^{j\omega t} \quad (29)$$

The exact solution for the pressure at point x due to the incident wave is $$p(x,t) = Pe^{j(\phi t + x \cos\theta)} \quad (30)$$

whose first derivative, when evaluated at the origin is:

$$\left(\frac{\partial p}{\partial x}\right)_{x=0} = jkP\cos\theta e^{j\omega t} \quad (31)$$

It should be noted that as k l increases, not only does the relative error increase, but other sources of error must also be considered. There exist errors associated with diffraction of sound waves, errors associated with neglecting the wave component parallel to the diaphragm plane (k y sin $\theta$), and errors associated with the relative orientations of the pressure microphones relative to each other.

In particular, these kinds of errors increase in magnitude dramatically as the wave frequency increases. The assumption of plane wave approximation is then no longer valid as one gets closer to the sound source (which corresponds to small values of k l), and relationships must be derived based on spherical wave considerations. In this type of situation, the relation of particle velocity to pressure is:

$$\frac{U}{P} = \frac{1}{\rho_0 c \cos\theta}; \quad (32)$$

$$\cos\theta = \frac{kr}{\sqrt{1 + (kr)^2}}$$

where r represents the distance from the source to the point of interest. This relationship is simply the reciprocal of the specific acoustic impedance of the medium.

The velocity sensor 30 of the present invention may be arranged as a multiplexed fiber tip based Fabry-Perot sensing system. In this implementation, micro-optical fiber tip sensors 30, shown in FIG. 2, are aligned in each direction of the x y z coordinate system. Then, following the scheme, shown in FIG. 8, for each of the sensors 30 there is an optical coupler 102 through which each sensor 30 is coupled to a respective photodetector 96 from the photodetector array 116. The outputs of the photodetectors 96 are coupled to the A-D input 114 of the PC 66 and the coupler 106 is connected to the IOC phase modulator 104 with the read-out interferometer 94 built therewithin. The calculations are performed by the PC 66 in accordance with the equations (24-32) supra.

In addition to the macro-scale prototype of the micro-optical pressure sensor 10, and a macro-scale prototype of the velocity (pressure gradient) sensor 30 has been developed for use in ASAC systems.

The accelerometer/pressure sensor 32, shown in FIGS. 3 and 5A-5H, includes the inertial mass-spring structure 64. As the accelerometer vibrates due to excitation z(t), structure 64 oscillates about the undeformed axis and the deflection w(x, t) at any point x along the undeformed axis of the structure 64 formed in the diaphragm layer 14 is a function of the excitation acceleration.

The fiber-tip sensor measures the deflection which produces the optical phase change in the micro-optical sensor 32 in accordance with the Eq. 21 (supra). Once the displacement is known as a function of time, the acceleration is calculated as the second time derivative of the displacement.

An alternate macro-scale version of the micro-optical accelerometer of the present invention was compared with a Dytran piezo accelerometer model number 3101AG. Both accelerometers were set on a vibrating circular plate supported on a cylindrical enclosure and excited by a piezoceramic patch driven by sinusoidal signals. The optical accelerometer data compares well with the Dytran piezo accelerometer in both time domain and frequency domain at low frequencies.

In summary, a micro-optical fiber based sensor system and the method of fabrication for same have been proposed for acoustic and vibration measurements over kHz to MHz bandwidth. The design of the sensor system of the present invention permits multiplexity on the input side of the system which is an important feature of the system. Additionally, the pressure gradient sensor and air particle velocity sensor can be built for acoustic and acoustic intensity measurements. The sensing system of the present invention may be used as a pressure sensor, a displacement sensor, and an acceleration sensor, and combination thereof.

The subject novel optical system design is based on low coherence fiber-optic interferometry techniques that has a sensor interferometer (Fabry-Perot interferometer, the cavity of which is formed between the tip of the fiber and the studied object) and a read-out interferometer (which is a Mach-Zehnder interferometer) built in the integrated optical circuit phase modulator. This permits a high dynamic range and makes the system less sensitive to the wavelength fluctuation of the light source and the optical intensity fluctuations. Furthermore, the use of this interferometry technique makes it possible to realize phase modulation for sensors with "small" cavity lengths which is important for micro-scale sensors.

A novel digital phase modulation and demodulation scheme is developed by taking advantage of an integrated optical circuit (IOC) phase modulator and further by using the multi-step phase-stepping algorithm. This scheme permits high frequency real time phase signal demodulation without using any demodulation hardware, active control elements, or multiple interferometers that are necessary for existing demodulation techniques.

Compared to conventional condenser microphone and other related sensors, the micro-optical fiber based sensors take advantage of micro-electromechanical fabrication techniques and low-coherence optical interferometry based fiber sensors. The novel sensor systems are immune to electromagnetic interference, have high sensitivity, are small in size, and they may also be multiplexed. In addition, these micro-optical sensors are electrically passive. The prior art systems used for acoustic intensity measurements are bulky in size and cannot be reduced to the spatial scales obtained with the subject fiber tip based fiber optic sensor system.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of the elements may be reversed or interposed, all without departing from the spirit or scope of the invention as defined in the appended Claims.

What is claimed is:

1. A micro-optical sensor system for pressure, acceleration, and pressure-gradient measurements, comprising:
   at least one sensor including:
      at least one substrate having a first and a second surface and a substrate material between said first and second surfaces,
      at least a pair of fiber guides formed in said substrate material extending therethrough between said first and second surfaces,
      a diaphragm layer formed on said first surface of said at least one substrate, and
      at least a pair of optical fibers received in said at least a pair of fiber guides, each of said at least a pair of optical fibers having a fiber tip displaced from said diaphragm layer by a predetermined distance, thereby forming a sensing interferometer having a Fabry-Perot cavity defined between said fiber tip and said diaphragm layer, said fiber tip and said diaphragm layer being optically reflective to form a pair of reflective surfaces of said sensing interferometer; and
   at least a further sensor including:
      a further substrate having a first and a second surface and a substrate material between said first and second surfaces of said further substrate, said further substrate being attached by said second surface thereof to said diaphragm layer of said at least one substrate,
      another diaphragm layer formed on said first surface of said further substrate, and
      at least one fiber guide formed in said further substrate in alignment with one of said at least a pair of said fiber guides of said at least one substrate, wherein one of said pair of said optical fibers is received in said at least one fiber guide formed in said further substrate through said one of said at least a pair of said fiber guides of said at least one substrate; and
   a data acquisition and processing unit coupled to said at least a pair of optical fibers for calculating an acoustic/vibration parameter to be measured.

2. The micro-optical sensor system of claim 1, wherein said at least one sensor is an acoustic pressure sensor wherein said data acquisition and processing unit calculates acoustic pressure.

3. The micro-optical sensor system of claim 1, wherein said at least one sensor is a pressure gradient sensor.

4. The micro-optical sensor system of claim 1, wherein said diaphragm layer is patterned to form an inertial mass-spring structure aligned with said at least one fiber guide, said inertial mass-spring structure being deflectable under excitation, and wherein said data acquisition and processing unit calculates deflection of said inertial mass-spring structure.

5. The micro-optical sensor system of claim 4, wherein said at least one sensor is an acceleration sensor, and wherein said data acquisition and processing unit calculates the excitation acceleration based on said deflection.

6. The micro-optical sensor system of claim 1, wherein said diaphragm layer is patterned to form an inertial mass-spring structure aligned with another of said at least a pair of said fiber guides formed in said at least one substrate.

7. The micro-optical sensor system of claim 1, wherein said diaphragm layer is patterned to form an opening defined therein aligned with said one of said at least a pair of said fiber guides formed in said at least one substrate.

8. The micro-optical sensor system of claim 1, wherein said one of said pair of said optical fibers is for transmitting a pressure signal, and wherein another of said pair of said optical fibers is for transmitting an acceleration signal.

9. The micro-optical sensor system of claim 1, further comprising:
   a light source,
   an Integrated Optical Circuit (IOC) phase modulator coupled to said light source to modulate the light beam generated from said light source,
   a read-out interferometer build in said IOC phase modulator, said read-out interferometer being path-matched to said sensing interferometer of each of said at least one and at least one of said further sensors;
   at least a pair of photodetectors, each photodetector being coupled to a respective one of said at least one and at least one of said further sensors, and
   a phase modulation-demodulation unit coupled to said IOC phase modulator and said at least a pair of the photodetectors for modulating said light beam in said IOC phase modulator in accordance with a multi-step phase-stepping pattern, and for demodulating data obtained from said at least a pair of the photodetectors in synchronism with said multi-step phase-stepping pattern, wherein said data acquisition and processing unit is coupled to said phase modulation-demodulation unit for controlling said multi-step phase-stepping pattern and for calculating phase signals of said sensors based on said obtained data.

10. The micro-optical sensor system of claim 9, further comprising at least one optical coupler, connected between said IOC modulator and said at least one sensor.

11. The micro-optical sensor system of claim 1, wherein said at least one substrate is a Si substrate.

12. A method of fabricating a micro-optical sensor system for acoustic and vibration measurements, comprising the steps of:

forming a first thin diaphragm layer on a first surface of a first substrate, patterning said first substrate to form at least a first fiber guide therein; and inserting a first optical fiber in said at least a first fiber guide;

patterning said first substrate to farm at least a second fiber guide therein, forming a second thin diaphragm layer on a first surface of at least a second substrate;

patterning said at least a second substrate to form at least a third fiber guide therein, attaching said at least second substrate by a second surface thereof to said first diaphragm layer formed on said first substrate, aligning said at least a third fiber guide with said at least a first fiber guide, inserting said first optical fiber in said at least the third fiber guide through said at least the first fiber guide, positioning a fiber tip of said first optical fiber a first predetermined distance from said second diaphragm layer to form a first sensing interferometer having a Fabry-Perot cavity defined between said fiber tip and said first diaphragm layer, said fiber tip and said first diaphragm layer being formed optically reflective to form a pair of reflective surfaces of said first sensing interferometer, inserting a second optical fiber in said at least a second fiber guide, and positioning a fiber tip of said second optical fiber a second predetermined distance from said first diaphragm layer to form a second sensing interferometer having a Fabry-Perot cavity defined between said fiber tip of said second optical fiber and said first diaphragm layer.

13. The method of claim 12, further comprising the steps of:

coupling a data acquisition and processing unit to said first optical fiber for calculating pressure, and to said second optical fiber for calculating excitation acceleration.

14. The method of claim 12, further comprising the steps of:

patterning said first diaphragm layer to form an inertial mass-spring structure aligned with said at least a first fiber guide, said inertial mass-spring structure being deflectable under excitation, and coupling a data acquisition and processing unit to said first optical fiber far calculating a deflection of said inertial mass-spring structure, and for calculating excitation acceleration based on said deflection.

15. The method of claim 12, further comprising the step of:

coupling a data acquisition and processing unit to said first optical fiber for calculating pressure.

16. A method of fabricating a micro-optical sensor system of multiple pressure measurements, comprising the steps of:

patterning a plurality of substrates to form fiber guides therein, forming a diaphragm layer on each of said plurality of the substrates, stacking said substrates together to form a single multiple-sensor unit, wherein predetermined fiber guides are aligned each to the other, inserting optical fibers in said fiber guides, positioning a fiber tip of each of said optical fiber a predetermined distance from a respective diaphragm layer, thus forming a plurality of sensing interferometers having a Fabry-Perot cavity defined between each said fiber tip and said respective diaphragm layer, and coupling a data acquisition and processing unit to said optical fibers for calculating acoustic parameters to be measured, said acoustic parameters comprising parameters from a group of acoustic parameters consisting of acoustic pressure, pressure gradient, deflection of a respective diaphragm layer, excitation acceleration, air particle velocity, and acoustic intensity.

* * * * *